(12) United States Patent
Löffelholz et al.

(10) Patent No.: US 8,623,112 B2
(45) Date of Patent: Jan. 7, 2014

(54) PROCESSES FOR PREPARING VALVE METAL POWDERS, POWDERS PREPARED THEREBY AND USES THEREFOR

(75) Inventors: Josua Löffelholz, Langelsheim (DE); Jürgen Hilpert, Kiedrich (DE)

(73) Assignee: H.C. Starck GmbH (DE)

( * ) Notice: Subject to any disclaimer, the term of this patent is extended or adjusted under 35 U.S.C. 154(b) by 946 days.

(21) Appl. No.: 12/067,063

(22) PCT Filed: Sep. 7, 2006

(86) PCT No.: PCT/EP2006/008809
§ 371 (c)(1),
(2), (4) Date: Apr. 8, 2008

(87) PCT Pub. No.: WO2007/031246
PCT Pub. Date: Mar. 22, 2007

(65) Prior Publication Data
US 2008/0254293 A1    Oct. 16, 2008

(30) Foreign Application Priority Data

Sep. 16, 2005   (DE) .......................... 10 2005 044 280

(51) Int. Cl.
| B22F 1/00 | (2006.01) |
| B22F 9/00 | (2006.01) |
| C21B 15/04 | (2006.01) |
| C22B 5/20 | (2006.01) |
| C22C 1/04 | (2006.01) |

(52) U.S. Cl.
USPC .............................................. 75/369; 75/622

(58) Field of Classification Search
USPC .............................. 75/363, 369, 622; 420/424
See application file for complete search history.

(56) References Cited

U.S. PATENT DOCUMENTS

| 4,582,530 | A | * | 4/1986 | Heinrich et al. | ............... | 420/424 |
| 4,684,399 | A | * | 8/1987 | Bergman et al. | ................ | 75/363 |
| 5,442,978 | A | | 8/1995 | Hildreth et al. | | |
| 7,066,979 | B2 | | 6/2006 | Loffelholz et al. | | |
| 7,431,751 | B2 | * | 10/2008 | Shekhter et al. | ................ | 75/369 |

FOREIGN PATENT DOCUMENTS

| CN | 1443618 | 9/2003 |
| DE | 33 30 455 A1 | 3/1985 |

* cited by examiner

*Primary Examiner* — Weiping Zhu
(74) *Attorney, Agent, or Firm* — Novak Druce Connolly Bove + Quigg LLP (57) ABSTRACT

Processes comprising: melting a mixture comprising a valve metal precursor and a diluting agent in at least one first vessel under a first set of temperature and residence time conditions; transferring the mixture to at least one second vessel; and initiating, in the at least one second vessel, a reaction of the valve metal precursor to form a valve metal under a second set of temperature and residence time conditions; valve metal powder prepared thereby and uses therefor.

12 Claims, 2 Drawing Sheets

PROCESSES FOR PREPARING VALVE METAL POWDERS, POWDERS PREPARED THEREBY AND USES THEREFOR

CROSS-REFERENCE TO RELATED APPLICATIONS

This application is a national stage application, under 35 U.S.C. §371, of PCT/EP2006/008809, filed Sep. 7, 2006, which claims priority of German Application No. 10 2005 044 280.3, filed Sep. 16, 2005.

BACKGROUND OF THE INVENTION

The invention concerns an improved valve metal electrolytic capacitor powder, in particular tantalum, and a process for its production by Na reduction in a series of stirred-tank reactors and a process for its production.

Valve metals, which are understood in particular to be tantalum and its alloys, along with other metals in group IVb (Ti, Zr, Hf), Vb (V, Nb, Ta) and VIb (Cr, Mo, W) of the periodic table and their alloys, are widely used in component manufacture. The use of niobium and tantalum in the production of capacitors should be mentioned in particular.

The production of niobium or tantalum capacitors conventionally starts with corresponding metal powders, which are first compressed and then sintered to produce a porous compact. This is anodised in a suitable electrolyte, during which process a dielectric oxide film forms on the sintered compact. The physical and chemical properties of the metal powders used have a decisive influence on the properties of the capacitor. Decisive characteristics are, for example, the specific surface area and the content of impurities.

Tantalum powder in a quality allowing its use in the production of capacitors is conventionally produced by sodium reduction of $K_2TaF_7$. $K_2TaF_7$ is placed in a retort and reduced with liquid sodium. This produces a highly porous agglomerate of primary particles. Controlling the particle size of both the agglomerate and the primary particle and the porosity is particularly important in this reaction. The particle size of the primary particle is proportional to the specific surface area and therefore proportional to the specific capacity of the capacitor that is subsequently manufactured therefrom. It is particularly decisive here for the particle size of each individual particle to be as uniform as possible, since for every forming voltage there is an optimum particle size for the primary particle which results in the maximum specific capacity. The particle shape, particle size and porosity of the agglomerate determines the subsequent processing characteristics such as flowability and impregnatability and the resulting electrical properties such as equivalent series resistance (ESR) and equivalent series inductance (ESL). It can be deduced from this that for every application characterised by a desired capacity level and application voltage and anode size, a particle with the optimum primary and agglomerate particle size produces the best results.

It is known from U.S. Pat. No. 5,442,978 that the particle fineness can be influenced by the reaction temperature, an excess of reducing agent and by the dilution ratio of $K_2TaF_7$ in the salt bath. U.S. Pat. No. 5,442,978 therefore proposes that in order to produce tantalum powder having a high specific surface area, highly diluted $K_2TaF_7$ should be produced by the stepwise addition of sodium, the addition taking place at high speed. During the course of this reaction, irregular concentration ratios occur, such that the particle size distribution of the resulting powder is very wide.

According to U.S. Pat. No. 4,684,399 it is advantageous to add the tantalum compound continuously or stepwise during the reaction. This measure ensures that the concentration remains uniform during the reduction process.

In DE 33 30 455 A1 a doping agent is added to the reaction with the aim of obtaining a finer particle size. This allows widespread control of the primary particle but not of the agglomerate particle, since by virtue of the batch process this produces a wide agglomerate particle size distribution typical of stirred-tank reactors. In industrial practice, this particle is therefore first agglomerated further by application of heat and then laboriously reduced to the desired particle size distribution by mechanical methods (grinding, fractional screening, sieving). CN 1443618 describes a process which likewise results in uniform tantalum powders which, because of the process conditions, are contaminated with magnesium in a concentration of >20 ppm, however. Elevated magnesium contamination levels can have a negative influence on the subsequent electrical properties of the powder, however, particularly on the residual current.

BRIEF SUMMARY OF THE INVENTION

The invention concerns an improved valve metal electroytic capacitor powder, in particular tantalum, and a process for its production by Na reduction in a series of stirred-tank reactors and a process for its production.

The object of the present invention is to produce a Ta powder having a uniform agglomerate and primary particle size and exhibiting Mg contamination levels of <20 ppm, preferably <10 ppm, optimised specific capacity values at a given forming voltage and a shape factor close to 1. The object was also to provide a process for producing valve metal powders. A further object was to provide a process which can be performed continuously, allows good control of the reaction conditions during the various reaction stages and a production of valve metal powders which have a narrow particle size distribution within a desired particle size range.

This object is achieved by a process for producing a valve metal, comprising
melting a mixture containing a valve metal precursor and diluting agent in a first vessel;
transferring the mixture to at least a second vessel in order to mix it under the same or different conditions of temperature and residence time, during which the reaction of the valve metal precursor to form a valve metal is initiated.

The ratio of diluting salt to valve metal precursor is generally greater than 1:5, mostly greater than 1:20.

Temperature and residence time in the second vessel can mutually independently be different from or the same as the conditions in the first vessel.

The mixture of valve metal precursor and diluting agent is mixed and melted in the first vessel. During this process the mixture is generally stirred or moved in another way so that the mixture is homogenised. The mixture is then transferred to a second vessel, in which the reaction of the valve metal precursor to form a valve metal is initiated. The temperature prevailing in the second vessel is the same as or different from the temperature in the first vessel. The residence time too can be the same as or different from the residence time of the mixture in the first vessel.

The total amount of reducing agent used is mainly 0.9 to 1.5 times or alternatively 1 to 1.05 times the stoichiometrically required amount for the complete reduction of the valve metal precursor.

In a further embodiment of the invention, the process according to the invention additionally includes transferring the mixture to at least a third vessel and mixing under the same or different conditions of temperature and residence time, in order to continue the further reaction of the valve metal precursor to form a valve metal.

In a further embodiment of the invention, the process according to the invention additionally includes transferring the mixture to at least a fourth vessel and mixing under the same or different conditions of temperature and residence time, in order to continue the further reaction of the valve metal precursor to form a valve metal.

DETAILED DESCRIPTION OF THE INVENTION

The mixture can be transferred in any way. Since the process can be performed continuously, the mixture inevitably has to be transferred from one vessel to the next if new mixture is continuously being melted and homogenised in the first vessel. The mixture can be transferred from one vessel to the next vessel via an overflow. In this way the residence time for the reactions is controlled by the speed at which the mixtures are introduced into and transferred out of the vessels. In a further embodiment of the invention, the residence time can be controlled through the use of a lowerable displacer in the various vessels or alternatively the mixture can be transferred in batches to the next vessel.

Controlling the residence time influences the size, density, surface area and bulk density of the particles. The temperature can likewise influence these product characteristics; whilst on the one hand elevated temperatures help to accelerate the reaction and hence to produce finer particles, on the other hand elevated temperatures also lead to a lumping (agglomeration) of the particles and hence to coarser particles having a smaller surface area. The residence time is understood to be the period of time in which a reaction or reactions take place. The total or overall residence time of the process is the sum of the residence time in each reaction vessel. The minimum residence time for the process is a residence time which is sufficient to precipitate a valve metal. The maximum residence time for the process is generally predefined by the desired product and process economics. For given reaction conditions and a given temperature, shorter overall residence times are generally required to produce smaller particle sizes and longer residence times are required to produce larger particle sizes. It is usually advantageous if the overall residence time is the shortest time which substantially allows a complete conversion of the valve metal precursor to the desired valve metal.

The residence times are generally around 5 to 30 minutes per vessel. The overall residence time as a rule is between 10 minutes and 4 hours, in particular 20 to 120 minutes.

Reactors which allow an inflow and outflow of substances, a control of the temperature by heating or cooling and the stirring of the reactor contents can advantageously be used as a vessel within the meaning of the invention. Continuous tank reactors with agitators have proven themselves in this connection, for example a series of suction-pipe reactor systems, in which the temperatures and residence times can substantially be the same or different and can be controlled independently of one another. The temperature of the vessels can be brought about by conventional means such as heating or cooling jackets or heating or cooling coils. These vessels and other devices used are known commercially and are not described in detail here. Furthermore, the process according to the invention is not restricted to being performed in a special plant and can be performed using a broad range of different plants which are suitable for performing the process steps described.

Although a first to fourth vessel is described above, further vessels can be used to control the process. Thus, for example, the second and third vessel can be replaced by two vessels each under the same or only slightly differing conditions, increasing the total number of vessels to six. Small vessel volumes, in the range from 10 to 60 liters for example, in particular 20 to 50 liters, are advantageous for good control of the reaction conditions. The significantly improved temperature control of the highly exothermic reaction in the reactor due to the small volume is advantageous here. In this way the reactions can be performed isothermally and high excess temperatures as in larger batch reactors are usually avoided. The comparatively small volume and hence the supposedly smaller material throughput in comparison to batch reactors can be offset by the possibility of continuous operation. Since with a constant inflow of reaction mixture the residence time increases with small vessel volumes and decreases with large vessel volumes, the residence time can also be varied through the choice of vessel volumes. If for example in a series of vessels of the same volume a vessel with a different volume is used, the residence time in this vessel necessarily differs from the other residence times unless it is counteracted by suitable measures.

During the reaction fresh valve metal precursor, reducing agent or doping agent can be added to one or more of the vessels, either alone or mixed with diluting agent.

In a further embodiment of the invention, the process according to the invention additionally includes the supplementary addition of valve metal precursor, diluting agent or a mixture thereof to the second vessel or to the third vessel or to both.

In a further embodiment of the invention, the process according to the invention includes the supplementary addition of a reducing agent, a diluting agent or a mixture thereof to the second vessel or to the third vessel or to both.

In a further embodiment of the invention, the process according to the invention includes the supplementary addition of a doping agent to one or more of the vessels used, with addition in particular to at least the first and/or second and/or third vessel. An addition to the first vessel is usually sufficient. By the addition of doping agent, particle growth can be initiated selectively; depending on the nature of the desired product an addition to one or more of the vessels can be advantageous.

The doping agent can be incorporated in the first vessel. In the last vessel of the reactor series there is advantageously no further addition of doping or reducing agent and the mixture is merely stirred to complete the reaction.

It is generally sufficient, however, for reducing agent to be added at least to the second vessel. Addition of the reducing agent can take place continuously or in portions and according to the desired reaction temperature. Addition in portions usually allows a better control of the temperature, as the reaction is highly exothermic. The amount of reducing agent added—regardless of whether it is added continuously or in portions—is determined by the limits of heat dissipation. If added too quickly, the temperature of the mixture can rise so sharply that the reducing agent evaporates, which is to be avoided. The temperatures in the vessels are generally 800 to 1050° C., in particular 850 to 1050° C. or 870 to 930° C. The temperatures in vessels in which there is no addition of reducing agent are generally lower, at 800 to 900° C.

The process according to the invention takes place under an inert gas atmosphere. Nobel gases in particular, such as helium, neon or argon, are particularly suitable here. However, other gases which do not react with the starting materials or products of the process can also be used.

Although on the one hand nitrogen is less preferred, it can be used if the formation of a nitride phase or the presence of nitrogen in the form of a solid solution is desired in the valve metal. In the latter case, the nitrogen is preferably introduced directly into the reaction mixture through a feed piper so that the gas can saturate the reaction mixture to the extent that is necessary and the nitrogen can be taken up by the reaction product as required. In this case approximately three to twenty times the amount of nitrogen corresponding to the amount required in the valve metal (in particular tantalum or niobium) is introduced. If a larger excess of nitrogen is used, crystalline nitride phases form which are usually not desirable. This process variant is advantageous for the production of niobium or tantalum for capacitor applications, in particular for niobium.

The mixture is preferably removed continuously from the last container and processed in a known manner. The mixture is discharged under inert gas, usually nitrogen or argon, and cooled, a temperature of 100° C. or less being regarded as suitable. The mixture is then passivated with air or steam, wherein residues of the reducing agent are broken down, and then comminuted. The mixture is then extracted with water or an acid and washed to remove residues of diluting agent, doping agent and reducing agent, and the valve metal powder that is obtained is dried.

A subsequent high-temperature treatment is also possible in order to stabilise, thicken and homogenise the sintered bridges between the primary particles or to bring about a coarsening.

The valve metal powder can then undergo deoxidation with magnesium or another reducing agent such as calcium, barium, cerium or lanthanum. To this end the valve metal powder is mixed intensively with calcium, barium, cerium or lanthanum and heated in an inert gas atmosphere, in particular argon, to a temperature above the melting temperature of the reducing agent.

The process according to the invention is particularly suitable for the production of niobium and tantalum metal powders. These powders are very suitable for capacitor applications and also for use or processing with cold gas sprays.

Valve metals according to the invention are metals from groups IVb, Vb and VIb of the periodic table, or Ti, Zr, Hf, V, Nb, Ta, Cr, Mo, W and alloys thereof, or tantalum or niobium.

A reducing agent within the meaning of the present invention is all substances which under the reaction conditions of the process according to the invention can bring about a reduction of the valve metal precursor to the elemental valve metal. In general these are alkali or alkaline-earth metals and their alloys, namely lithium, sodium, potassium, rubidium, caesium, beryllium, magnesium, calcium, strontium and barium; or alkali metals and their alloys; or sodium, potassium, calcium and their alloys; or the reducing agent contains lanthanum, yttrium or cerium; or the reducing agent is an unpurified mixture of various rare-earth metals classed as a misch metal; or the reducing agent contains at least one alkali metal; or sodium or potassium; or the reducing agent is sodium.

A valve metal precursor according to the invention is a substance which can be converted to the desired valve metal under the influence of the reducing agent. These are therefore valve metal compounds, such as valve metal chlorides, for example niobium pentachloride, tantalum pentachloride, niobium subchloride, tantalum subchloride and the corresponding iodides or bromides; in particular the complex halides of the valve metals, in particular alkali halometallates of the valve metals such as sodium or potassium heptafluorotantalate or sodium or potassium heptafluoroniobate or sodium or potassium heptachlorotantalate or sodium or potassium heptachloroniobate, oxides and hydrides of tantalum and niobium such as tantalum hydride, niobium hydride, tantalum pentoxide, niobium pentoxide, tantalum dioxide, niobium dioxide, niobium monoxide, tantalum monoxide, or mixtures containing the aforementioned valve metal precursors.

Diluting agents according to the invention are substances which serve as a reaction medium but are not themselves involved in the reaction and which are liquid under the reaction conditions. These are mostly alkali or alkaline-earth salts, in particular alkali and/or alkaline-earth halides, namely lithium chlorider lithium bromide, lithium fluoride, lithium iodide, sodium chloride, sodium bromide, sodium fluoride, sodium iodide, potassium chloride, potassium bromide, potassium fluoride, potassium iodide, potassium chloride, magnesium chloride, magnesium bromide, magnesium fluoride, magnesium iodide, calcium chlorides calcium bromide, calcium fluoride, calcium iodide or mixtures thereof; or sodium chloride, sodium bromide, sodium fluoride, potassium chloride, potassium bromide, potassium fluoride, or sodium chloride, potassium chloride, potassium fluoride or mixtures of the aforementioned salts.

Doping agents according to the invention are alkali salts with sulfur-containing anions, nitrides, elemental sulfur, alkali metal phosphates, alkali metal borates or boron compounds, in particular alkali metal sulfides, sulfites and sulfates, ammonium salts, nitrates, nitrites, ammonium sulfide, ammonium sulfite, ammonium sulfate, ammonium nitrate, ammonium nitrite or sodium sulfide, sodium sulfite, sodium sulfate, sodium nitrate, sodium nitrite, potassium sulfide, potassium sulfite, potassium sulfate, potassium nitrate, potassium nitrite, sodium phosphate, potassium phosphate, potassium borate, sodium borate, sodium boron fluoride, potassium boron fluoride, boron nitride or mixtures thereof; or sodium sulfate, potassium sulfate or mixtures thereof.

An embodiment of the invention comprises a process for producing a valve metal, comprising
  melting a mixture containing a valve metal precursor and diluting agent in a first vessel;
  transferring the mixture to at least a second vessel in order to mix it under the same or different conditions of temperature and residence time, during which the reaction of the valve metal precursor to form a valve metal is initiated;
  transferring the mixture to at least a third vessel and mixing under the same or different conditions of temperature and residence time, in order to continue the further reaction of the valve metal precursor to form a valve metal;
  transferring the mixture to at least a fourth vessel and mixing under the same or different conditions of temperature and residence time, in order to continue the further reaction of the valve metal precursor to form a valve metal.

A further embodiment of the invention comprises a process for producing a valve metal, comprising
  melting a mixture containing a valve metal precursor and diluting agent in a first vessel at a first temperature and for a first residence time, wherein a first mixture is obtained;
  transferring the first mixture to at least a second vessel in order to mix it at a second temperature and for a second residence time, during which the reaction of the valve metal precursor to form a valve metal is initiated and a second mixture is obtained;

transferring the second mixture to at least a third vessel and mixing at a third temperature and for a third residence time, in order to continue the further reaction of the valve metal precursor to form a valve metal, wherein a third mixture is obtained;

transferring the third mixture to at least a fourth vessel and mixing at a temperature and for a fourth residence time, in order to continue the further reaction of the valve metal precursor to form a valve metal.

A further embodiment of the invention comprises a process for producing a valve metal, comprising melting a mixture containing a valve metal precursor and diluting agent in a first vessel at a first temperature and for a first residence time, wherein a first mixture is obtained;

transferring the first mixture to at least a second vessel in order to mix it at a second temperature and for a second residence time, during which the reaction of the valve metal precursor to form a valve metal is initiated and a second mixture is obtained;

transferring the second mixture to at least a third vessel and mixing at a third temperature and for a third residence time, in order to continue the further reaction of the valve metal precursor to form a valve metal, wherein a third mixture is obtained;

transferring the third mixture to at least a fourth vessel and mixing at a temperature and for a fourth residence time, in order to continue the further reaction of the valve metal precursor to form a valve metal, wherein reducing agent is added to the second and third vessel.

A further embodiment of the invention comprises a process for producing a valve metal, comprising melting a mixture containing a valve metal precursor and diluting agent in a first vessel at a first temperature and for a first residence time, wherein a first mixture is obtained;

transferring the first mixture to at least a second vessel in order to mix it at a second temperature and for a second residence time, during which the reaction of the valve metal precursor to form a valve metal is initiated and a second mixture is obtained;

transferring the second mixture to at least a third vessel and mixing at a third temperature and for a third residence time, in order to continue the further reaction of the valve metal precursor to form a valve metal, wherein a third mixture is obtained;

transferring the third mixture to at least a fourth vessel and mixing at a fourth temperature and for a fourth residence time, in order to continue the further reaction of the valve metal precursor to form a valve metal, wherein doping agent is added to the first vessel and reducing agent to the second and third vessel.

Figure 1:
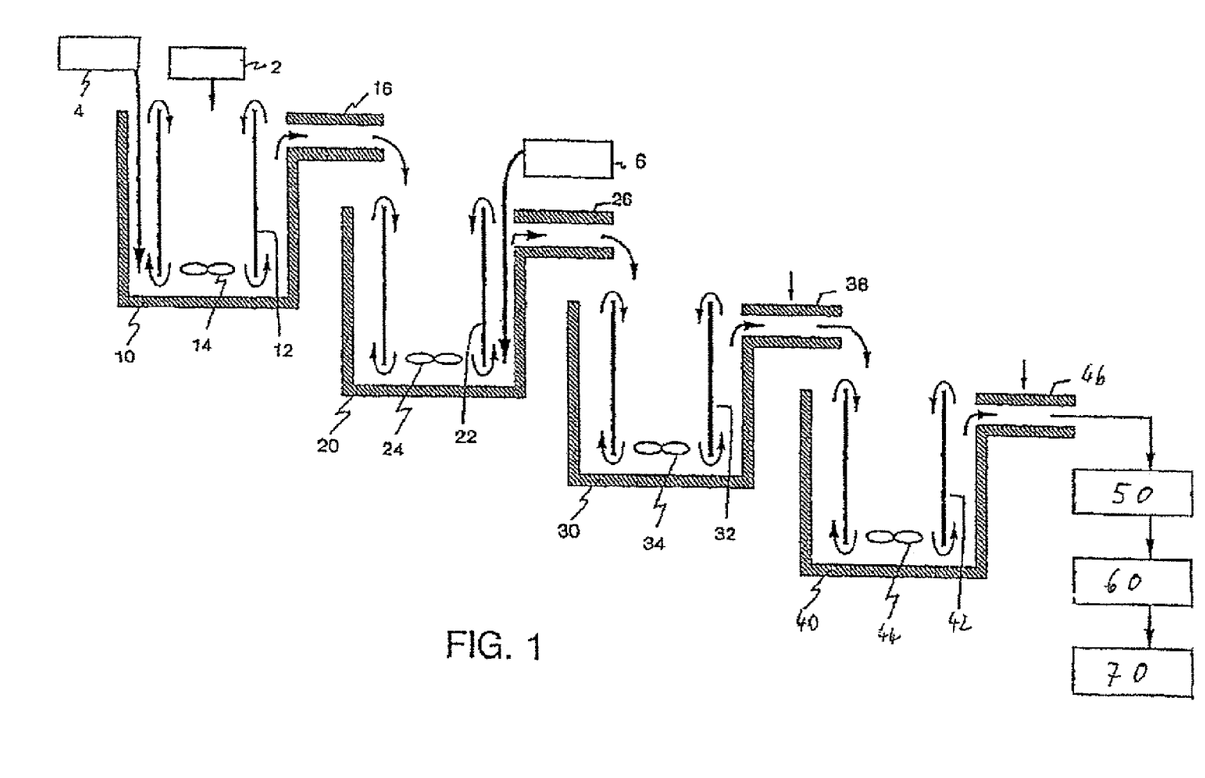

FIG. 1 provides a schematic illustration of a reactor system for performing the process according to the invention. Although the vessels in this diagram appear to be open, the need for the process according to the invention to be performed under an inert gas atmosphere should be pointed out here. FIG. 1 shows the diagram of a cascade reactor system in which the process according to the invention can advantageously be performed and which comprises a series of reaction vessels with suction pipes and circulating devices (agitators). Such reaction vessels, suction pipes and circulating devices which are suitable for use in the process according to the invention are known commercially and are therefore not described here in detail. The process is not restricted to being performed in a specific plant and can be performed using a broad range of different plants.

In an advantageous process according to the invention a valve metal precursor 2 is introduced into the top centre of the first reaction vessel 10. The diluting agent 4 is advantageously added at the same time. In a particularly advantageous embodiment of the invention the diluting agent and valve metal precursor are mixed together first and the mixture is added.

The addition of valve metal precursor 2 and diluting agent 4 takes place outside the area defined by the suction pipe or flow spoiler 12. The rate of addition depends on the desired residence time for the reactions taking place in the vessel, the size of the first reaction vessel and the speed at which the first mixture is transferred out of the vessel. Moreover, the rate of addition partly depends on the desired particle size of the end product, the primary particle size being mostly 0.1 to 1 µm and the agglomerate particle size 30 to 300 µm. The first reaction vessel 10 is held at a first temperature (T1), which is determined partly by the starting materials used and partly by the desired particle size of the end product. T1 is generally in the range from 800 to 1050° C., in particular 850 to 1050° C. or 800 to 900° C. or 870 to 930° C. Heat exchangers (e.g. a heating jacket surrounding the vessel or heating coils or plates, not shown in FIG. 1) can be used to maintain the reaction vessels 10, 20, 30 and 40 at the desired temperatures. The circulating device 14, for example an agitator or a pump, is used to circulate and to mix the valve metal precursor 2 and the diluting agent 4 inside the reaction vessel in order to obtain a first mixture. The direction of flow of the first mixture in the first reaction vessel can be as indicated by the arrows.

During circulation, part of the first mixture in the first reaction vessel 10 passes through the pipe 16. The residence time for the reaction which takes place in the first reaction vessel, R1, can be controlled by varying the flow rate and/or the reactor size and/or by using a lowerable displacer in the various vessels. Through the use of a lowerable displacer in the various vessels, the mixture can also be transferred to the next vessel in batches. The residence time partly determines the size, density, surface area and bulk density of the particles. For particular reactor sizes R1 can be in the range from 20 to 120 minutes, but mostly in the range from 5 to 30 minutes. For a given residence time R1 and a given temperature T1, higher values for R1 lead to an end product whose primary powder has a 1 to 4 g/inch$^3$ higher bulk density in the range from 12 to 20 g/inch$^3$.

The part of the first mixture which leaves the first reaction vessel 10 through the pipe 16 is introduced into the inner area of a second reaction vessel 20 in the area defined by the suction pipe 22. The rate of addition of the first mixture to the second reactor vessel 20 depends on the speed at which the first mixture is transferred from the first reaction vessel 10. The reducing agent 6 is added in the outer area and close to the floor of the second reaction vessel 20 outside the area defined by the suction pipe 22. The rate of addition of the reducing agent 6 depends on the size of the second reaction vessel, the desired residence time for the reactions taking place in the second reaction vessel and the speed at which the first mixture is transferred to the second reaction vessel. Moreover, the rate of addition of the reducing agent 6 also depends on the desired temperature T2 of the second mixture, which partly determines the desired particle size of the end product. Generally T2 is in the range from 800 to 1050° C., in particular 850 to 1050° C. or 870 to 930° C.

The second reaction vessel 20 is held at a second temperature T2 which is partly determined by the desired density of the particles in the end product, the desired size of the particles in the end product and the reaction rate. T2 is generally in a range from 800° C. to 1050° C., but always sufficiently low that the reducing agent does not evaporate to any significant extent. For a given temperature and residence time, a higher value for T2 leads to an end product with a larger, coarser particle size. The circulating device 24 is used to circulate and to mix the mixture entering the second reaction vessel and the reducing agent 6 in the reaction vessel 10, forming a second mixture. The direction of flow of the second mixture in the second reaction vessel is indicated by the arrows. Depending on the desired product, reversing the direction of flow can influence the particle characteristics.

During circulation, part of the second mixture leaves the second reaction vessel through the pipe 26. The residence time R2 for the reaction taking place in the second reaction vessel can be controlled by varying the circulating rate and/or the reactor size and/or by using a lowerable displacer and partly determines the completion of the reaction in the second vessel. The residence time partly determines the size, density, surface area and bulk density of the particles. To a certain degree it allows precipitation and compaction of the particles consisting of the reaction product, the desired refractory metal. By varying R2, products having differing particle sizes, densities, surface areas and particle bulk densities can thus be obtained. R2 can be in the range from 2 to 90 minutes. For a given T2, a higher value for R2 gives an end product exhibiting denser and coarser particles.

The part of the second mixture which leaves the second reaction vessel 20 through the pipe 26 is fed into the inner area of a third reaction vessel 30 inside the area defined by the suction pipe 32. The rate of addition of the second mixture to the third reaction vessel 30 depends on the speed at which the second mixture is transferred from the second reaction vessel 20.

The circulating device 34 is used to circulate the second mixture in the third reaction vessel and to mix it further to allow a substantially complete precipitation of the refractory metal. The direction of flow of the second mixture in the third reaction vessel is indicated by the arrows but is not a limiting characteristic of the reaction. In cases in which no additional reducing agent, diluting agent, valve metal precursor or doping agent is added to the third reaction vessel, the temperature of the mixture in the third reaction vessel, T3, is generally slightly lower than T2, depending on the degree of completeness of the reaction in the third reaction vessel and on the rate of addition of the second mixture to the third reaction vessel 30.

The third reaction vessel 30 is held at a temperature T3, which is partly determined by the degree of the desired completion of the reaction in the vessel. T3 is generally in a range from 800 to 1050° C., or 850 to 1050° C. or 870 to 930° C., in particular 880 to 920° C.; if no additional reducing agent is added in the third reaction vessel, T3 is in particular 800 to 900° C. For a given residence time, a higher value for T3 leads to a substantially complete end product reaction. During circulation, part of the mixture leaves the third reaction vessel through a discharge pipe 36. The residence time for the reactions taking place in the third reaction vessel can be controlled by varying the circulating speed and the size of the reaction vessel. The residence time of the mixture in the third reaction vessel, R3, partly determines the completion of the reaction to form the end product. R3 can be in the range from 20 to 120 minutes, in particular 5 to 30 minutes. For a given temperature T3, higher values for R3 lead to an end product exhibiting denser, coarser particles.

During circulation, part of the third mixture leaves the second reaction vessel through the pipe 36.

The part of the third mixture which leaves the third reaction vessel 30 through the pipe 36 is fed into the inner area of a fourth reaction vessel 40 inside the area defined by the suction pipe 42. The rate of addition of the third mixture to the fourth reaction vessel 40 depends on the speed at which the third mixture is transferred from the third reaction vessel 30.

The circulating device 44 is used to circulate the third mixture in the fourth reaction vessel and to mix it further to allow a completion of the precipitation of the refractory metal. The direction of flow of the third mixture in the fourth reaction vessel is indicated by the arrows but is not a limiting characteristic of the reaction. No additional reducing agent, diluting agent, valve metal precursor or doping agent is added to the fourth reaction vessel as a rule. The temperature of the mixture in the fourth reaction vessel, T4, is generally slightly lower than T3, depending on the degree of completion of the reaction in the fourth reaction vessel and the rate of addition of the third mixture to the fourth reaction vessel 40.

The fourth reaction vessel 40 is held at a temperature T4, which is partly determined by the degree of completion of the reaction in the previous vessel. T4 is generally in a range from 800 to 1050° C. or 850 to 1050° C. or in particular 800 to 900° C.

During circulation, part of the mixture leaves the fourth reaction vessel through a discharge pipe 46. The residence time for the reactions taking place in the fourth reaction vessel can be controlled by varying the circulating speed and the size of the reaction vessel. The residence time of the mixture in the fourth reaction vessel, R4, partly determines the completion of the reaction to form the end product. R4 can be in the range from 20 to 120 minutes, in particular 5 to 30 minutes. For a given temperature T4, higher values for R3 lead to an end product exhibiting denser, coarser particles.

The solution which leaves the fourth reaction vessel 40 through the discharge pipe 46 flows to a conventional processing plant in which in a step 50 the mixture is cooled to a temperature of less than 100° C., causing the mixture to solidify, and is passivated by controlled addition of air. This air can be concentrated with steam or replaced by steam. The solidified, passivated mixture is then comminuted in step 50. The precipitated, solid valve metal is separated from the mixture by a step 60, in which the water-soluble components are dissolved in demineralised water, which can contain an acid, any residues of the reducing agent are dissolved in an acid solution, for example with hydrogen peroxide-containing sulfuric acid, and after washing, the valve metal is obtained by means of a liquid/solids separation step. The liquid/solids separation step can be performed by any means known in the art, for example by filtration or centrifugation. The liquid/solids separation step is preferably performed through a vacuum or pressure filter.

After washing, the solids are dried, as indicated by the drying step 70. The product obtained is a valve metal powder exhibiting a narrow particle size distribution, a desired particle size and a desired sphericity. The process step 70 can optionally also include a phosphorus doping step. Here the phosphorus content of the valve metal powder is adjusted by treating the valve metal with an ammonium hydrogen phosphate solution ($(NH_4)H_2P_4$ solution) for example and then drying it. The valve metal obtained in this way can then undergo further processing steps.

For example, a high-temperature treatment, a deoxidation step or a combination thereof can follow.

Although the addition of materials and reagents has been described with reference to particular components of the reaction vessels, the materials and reagents can be added to alternative parts of the reaction vessels in order to produce end products having different properties. For example, in the first reaction vessel the valve metal precursor 2 can be added to the outer area of the vessel and the diluting agent 4 to the centre of the vessel; or alternatively the valve metal precursor and diluting agent are mixed outside the first vessel and then added; or in addition to the valve metal precursor 2 and the diluting agent 4 a doping agent is added; or alternatively the valve metal precursor and diluting agent and doping agent are mixed outside the first vessel and then added. Furthermore, it is obvious that although four reaction vessels are used in the previous embodiment, the process according to the invention can be performed with a smaller or larger number of reaction vessels, depending on the desired properties of the end product and on the desired process control.

The present invention also concerns powders having uniform primary particle and agglomerate particle sizes and a magnesium content of less than 20 ppm, in particular less than 10 ppm, or from 0 to 20 ppm, or from 0 to 10 ppm, in particular from 0 to 1 ppm.

The powder has primary particle sizes d of between 0.1 and 2 μm with a half-width of 0.3 times the mean value, preferably 0.1 times the mean value.

The average agglomerate particle size has a D50 value, determined with a MasterSizer in accordance with ASTM B 822, of 40 to 200 μm, preferably 60 to 120 μm, wherein the valve metal powder flows freely through a Hall flow funnel (ASTM B 212 or B 417) with a funnel opening diameter of 2/10 inch, preferably 1/10 inch.

The valve metal powders according to the invention have a narrow particle size distribution and a shape factor close to 1.

The D90 value, determined with a MasterSizer in accordance with ASTM B 822, preferably corresponds to a maximum of 1.5 times the D50 value, determined with a MasterSizer in accordance with ASTM B 822, particularly preferably a maximum of 1.3 times the D50 value. The ratio of D/d is >100.

By virtue of the uniform, controlled reaction conditions, the contamination levels with sodium or potassium (total alkali content) are less than 20 ppm, in particular less than 10 ppm, or from 0 to 20 ppm, or from 0 to 10 ppm, or from 0 to 5 ppm, in particular from 0 to 1 ppm.

The valve metal powder consists of agglomerates whose average particle size is no more than 2.0 μm (FSSS), preferably no more than 1.7 μm (FSSS), in particular 0.35 μm to 1 μm, and the agglomerates consist of primary single particles (primary particle size), whose average particle size is no more than 0.7 μm (FSSS), in particular 100 to 400 nm, determined from scanning electron microscopy (SEM) images.

After sintering at 1100 to 1300° C. for 10 minutes and subsequent forming at a voltage of 16 to 30 volts, the valve metal powders have a specific capacity of 80,000 to 300,000 μFV/g, or a capacity of 120,000 to 240,000 μFV/g, in particular a capacity of 140,000 to 200,000 μFV/g; the leakage current under these conditions is less than 1.6 nA/μFV.

The valve metal powder according to the invention has a BET specific surface area of 1.5 to 20 m$^2$/g, or 5 to 15 m$^2$/g, or 6.3 to 13.7 m$^2$/g, in particular 9.6 to 12.7 m$^2$/g (3-4-5 m$^2$).

The powders can also be doped with nitrogen and contain 100 ppm to 20,000 ppm, or 300 ppm to 3000 ppm, or 3000 to 8000 ppm, in particular 3200 to 6100 ppm nitrogen. If the nitrogen content is over 3000 ppm, then the nitrogen is preferably present in the valve metal in the form of a solid solution of nitrogen. In particular it is a tantalum or niobium powder, in particular a niobium powder.

The valve metal powders, in particular the tantalum and niobium powders, are suitable for producing capacitors and for processing with cold gas sprays. The present invention thus also concerns the use of the valve metal powders for producing capacitors or for processing by means of the cold gas spray method, a capacitor containing a valve metal powder according to the invention, sintered metal compacts containing a valve metal powder according to the invention and electrical or electronic devices containing a capacitor which contains a valve metal powder according to the invention.

The particle shape factor f determined by SEM image analyses has a mean value f within the limits $0.65</=f</=1.00$ or $0.70</=f</=0.95$ or $0.75</=f</=0.90$ or $0.80</=f</=0.90$ and the associated standard deviation is preferably (delta) $f</=0.10$.

The powders according to the invention are thus characterised by high fineness combined with a narrow particle size distribution and virtually spherical particles with very slight variations in the particle shape.

The particle shape factor can be determined on SEM images of the corresponding powder particles by means of linear and particle shape analysis. The powders should be prepared for this in such a way that the sample examined in SEM is representative, in other words that no concentration or depletion of fine or coarse powder particles occurs as a result of the preparation.

The particle dimensions can be determined by the known method of chord length measurement. The measurements of the particle circumference U and the particle surface area A required for particle shape characterisation (two-dimensional projection of the particle onto the image surface) can be determined from the defined particle dimensions in accordance with the formulae given below.

The diameters $d_U$ and $d_A$ characterise two different, spherical reference particles, whose projections onto the plane surface have (a) the same circumference U and (b) the same surface area A as the actual (analysed) particle.

Figure 2:
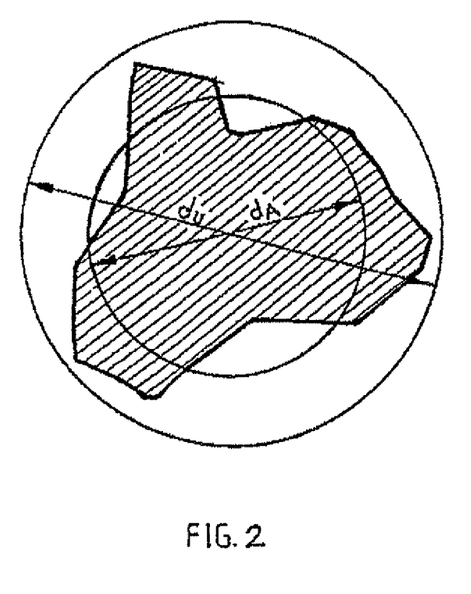

FIG. 2 shows a schematic illustration to explain the shape factor f:

$d_U$=diameter of a circle whose circumference U is equal to the projected particle circumference $d_A$=diameter of a circle whose surface area is equal to the (projected) particle surface area, where $(d_A</=d_U)$.

The shape factor is a measure of the sphericity of the powder particles.

The shape factor is defined as follows. Two diameters $d_U$ and $d_A$ are introduced and defined by $$d_U = U/\pi \quad d_A = (4A/\pi)^{1/2}$$

The particle shape factor f is calculated from the surface area A and the particle circumference U, where U is the circumference and A the surface area of the particle projection or the particle cross-sectional area, see FIG. 2. The shape factor f is defined by $$f = \left(\frac{d_A}{d_U}\right) = \left(\frac{4\pi A}{U^2}\right)$$

The particle cross-sectional area A and the circumference of this surface area U can be measured by, for example, image analyses of SEM images or sections. For an exactly spherical particle f=1. For spherical particles which are almost sphere-shaped, f is somewhat smaller, but almost 1, and for particles which deviate strongly from the spherical shape, f is markedly less than 1.

The powder according to the invention can be produced by producing $K_2TaF_7$ with sodium continuously in a series of stirred-tank reactors, preferably a two- to four-stage series. In a preferred embodiment the series of stirred-tank reactors is configured without valves to wet the liquid melt. The $K_2TaF_7$ can be added in solid or liquid form. Melting of the $K_2TaF_7$ takes place in the first reactor. If the addition takes place in liquid form, only $K_2TaF_7$ and optionally diluting salts such as KCl, KF or NaCl and doping agents such as sodium sulfate or potassium sulfate are introduced into the first reactor. Through the use of a lowerable displacer in the first vessel, the melt can also be transferred to the next vessel in batches. Sodium is added to the other stirred-tank reactors in such a way that the reaction takes place in a narrow temperature window. The sodium is preferably added in batches, the total amount of sodium is 0.95 to 1.06 times the stoichiometric ratio to $K_2TaF_7$, the shot size is 1 kg to 10 kg, in particular 2 kg to 5 kg, of sodium. The reaction temperatures are between 850 and 1050° C., preferably 880 to 950° C. or 880 to 950° C. The heat generated during the exothermic reaction is dissipated through the walls. These are cooled with air or by means of heat exchangers. In the final cascade the reaction is stirred until it is completed. The reaction can be controlled by means of the rate of addition of $K_2TaF_7$, Na, diluting salt and doping agent. The exothermic nature of the reaction can be controlled particularly well by the relatively small sizes of the reactors; even with given fixed reactor dimensions the residence time can be varied by the intensity of cooling. The average residence times are between 10 min and 4 h, preferably between 20 and 120 min. In a preferred embodiment the series of stirred-tank reactors is configured in such a way that the individual tanks are permanently connected to one another by means of overflows. The product is drawn off continuously. In a preferred embodiment the melt is drained off under argon into an interchangeable conical container. Then the reaction product is cooled to <100° C., passivated with air or steam and comminuted in a crusher. The further processing of the reaction product takes place in a known manner. It is extracted in water with addition of acid and washed in order to remove diluting salts and residues of NaOH and doping agent, and the tantalum powder obtained is dried. A phosphorus doping step can optionally be added here, wherein the tantalum metal powder is treated with an $(NH_4)H_2PO_4$ solution to adjust the P content in the finished tantalum metal powder. The powder is then exposed to a high-temperature treatment in vacuo. For example it is heated for 30 minutes to 1250° C. to 1500° C., preferably to 1280° C. to 1450° C., particularly preferably to 1280° C. to 1360° C. or 1000° C., in the case of powders having BET surface areas of more than 3 m²/g preferably at temperatures of between 1000 and 1200° C. The tantalum powder produced in this way then undergoes deoxidation with magnesium or other reducing agents (Ca, Ba, Ce, La). To this end the powdered reducing agent is mixed with the Ta powder and treated at temperatures of between 700 and 1100° C. under protective gas (argon) or in vacuo for 1 to 10 h, leading to a gas phase deoxidation of the refractory metal. As an alternative, a gas deoxidation with gaseous magnesium can also be performed. The powder is then cooled, passivated with air and washed with dilute acid (sulfuric acid or nitric acid) and then dried.

EXAMPLES

Unless otherwise specified, the percentage figures are percentages by weight (wt. %).

The capacity of the valve metal powder is determined by means of the following procedure: cylindrical compacts measuring 4.1 mm in diameter and 4.26 mm in length and having a compressed density of 4.8 g/cm³ are produced in each case from 0.296 g of a deoxidised valve metal powder, a tantalum wire measuring 0.2 mm in diameter being placed axially in the stamping press before introduction of the valve metal powders as a contact wire. The compacts are sintered at a sintering temperature of 1330° C. to 1430° C. for 10 minutes in a high vacuum (<10⁻⁵ mbar) to form anodes. The anode bodies are dipped into 0.1 wt. % phosphoric acid and formed under a current intensity limited to 150 mA until a forming voltage of 30 V is reached. Once the current intensity drops, the voltage is maintained for a further 100 minutes. A electrolyte consisting of 18 wt. % sulfuric acid is used to measure the capacitor properties. A frequency of 120 Hz is used for the measurements. The residual current is then measured in phosphoric acid having a conductivity of 4300 µS. The values obtained for the capacity of the single anode and the residual current of the single anode are standardised to µFV/g, where µF=capacity, V=forming voltage, g=anode mass, or µA/g where µA=measured residual current and g=anode mass used, or µA/µFV.

The valve metal powders according to the invention are preferably niobium or tantalum powders, wherein these are optionally doped with one another and/or with one or more of the metals Ti, Mo, V, W, Hf and Zr. Other doping elements, such as phosphorus for example, are possible.

The valve metal powders according to the invention can be used for a wide range of applications and are particularly suitable for producing solid electrolytic capacitors.

The examples below serve to illustrate the invention in greater detail; the examples are intended to simplify understanding of the principle according to the invention and should not be understood as a restriction thereof.

Example 1

Comparative Example

A tantalum primary powder was produced from a mixture of 150 kg of $K_2TaF_7$, 136 kg of KCl, 150 kg of KF, 4 kg of an ultrafine tantalum powder and 300 g of $Na_2SO_4$ in a nickel-coated INCONEL retort by the incremental addition of sodium at a reduction temperature of 900° C. in a manner analogous to U.S. Pat. No. 5,442,978. The tantalum powder was isolated from the cooled and comminuted reaction mixture by washing with weakly acidulated water, after which a further cleaning treatment with a washing solution containing sulfuric acid and hydrogen peroxide was performed. The material was doped with a sodium dihydrogen phosphate solution containing 1 mg of P per ml of solution to give a phosphorus content of 20 ppm. After drying, a heat treatment was performed in a high vacuum at 1430° C. The phosphorus content of the tantalum powder was then adjusted to 60 ppm by means of the sodium dihydrogen phosphate solution (1 mg of P per ml). The powder contains the following impurities (in ppm):
Mg: <1 ppm
Na: 0.7 ppm
K: 7 ppm 2 kg of the starting powder from Example 1 were mixed with 50 g of magnesium chips (2.5 wt. %) and heated to 980° C. in a covered tantalum crucible in a retort under an argon atmosphere for 3 h. After cooling and the controlled introduction of air for passivation, the reaction product is removed and magnesium oxide that has formed is removed with a washing solution consisting of dilute sulfuric acid and hydrogen peroxide solution. The washing solution is decanted off and the powder washed with demineralised water in a suction filter until free from acid. The dried powder has an oxygen content of 2781 ppm.

1.8 kg of this powder are then subjected to a second deoxidation step. To this end 11.4 g of magnesium chips (based on an oxygen content of 1.5 times the stoichiometric amount) are mixed with the powder and this mixture is likewise heated for 3 h to 980° C. After cooling and passivation, the MgO that has formed is again removed by an acid wash, and the powder is washed until free from acid.

The powder produced in this way contains the following impurities:
Mg: 8 ppm
Na: 1 ppm
K: 6 ppm The electrical test indicated a capacity of 38261 CV/g at a sintering temperature of 1400° C.

B1. Valve Metal Powders Obtained—Comparative Examples

| No. | Valve metal | T2 °C. | Inert gas | Cap. kCV/g | BET m$^2$/g | Mg < ppm | Na < ppm | K ppm | N2 ppm | O2 ppm |
|---|---|---|---|---|---|---|---|---|---|---|
| 1 | Ta | 980 | Ar | 53 | 0.9 | 20 | 3 | 10 | 500 | 3100 |
| 2 | Ta | 980 | Ar | 89 | 2.09 | 25 | 0.5 | 0.5 | 1304 | 6290 |
| 3 | Ta | 980 | Ar | 63 | 1.22 | 25 | 0.5 | 0.5 | 1100 | 5500 |
| 4 | Ta | 1020 | Ar | 70 | 1.43 | 25 | 1 | 1 | 700 | 3700 |
| 5 | Ta | 930 | Ar | 91 | 2.11 | 25 | 0.5 | 0.5 | 1240 | 6450 |
| 6 | Ta | 950 | Ar | 153 | 3.23 | 30 | 1 | 1 | 1700 | 7858 |
| 7 | Ta | 980 | Ar | 150 | 3.01 | 30 | 1 | 1 | 1300 | 8148 |
| 8 | Ta | 980 | Ar | 200 | 4.45 | 70 | 1 | 1 | 1500 | 11877 |

Example 2

A mixture comprising 150 kg of the potassium hexafluoro salt of the valve metal is mixed with 150 kg of potassium chloride, 150 kg of potassium fluoride and potassium sulfate and metered continuously into the first reaction vessel. There the mixture is heated to 900° C. and transferred to a second vessel after melting. There the total amount of 50 kg of sodium is added continuously with temperature control in such a way that the temperature does not exceed 1050° C. and the mixture is transferred to a third vessel. There it is stirred at a temperature of 880° C. and the reaction mixture is transferred through an overflow to a fourth vessel. If the temperature in the third vessel exceeds 900° C., one third of the reaction mixture is transferred to the fourth vessel by lowering a displacer and the reduced volume is maintained until the temperature has fallen to 880° C. again. In the fourth vessel the temperature is adjusted to 880° C., the mixture is stirred and continuously removed. The reaction was performed under inert gas. After the reaction the reaction mixture is cooled and comminuted. The tantalum powder is isolated from the cooled and comminuted reaction mixture by washing with weakly acidulated water, after which it is washed again with a washing solution containing sulfuric acid and hydrogen peroxide. The material is doped with a sodium dihydrogen phosphate solution containing 1 mg of phosphorus per ml of solution to give a phosphorus content of 20 ppm. After drying, a heat treatment is performed in a high vacuum at 1430° C. The phosphorus content of the tantalum powder was then adjusted to 60 ppm by means of the sodium dihydrogen phosphate solution (1 mg of phosphorus per ml). The powders contain the following impurities (in ppm):
Mg: <1 ppm
Na: 0.7-0.8 ppm
K: 3-5 ppm The powder obtained is then deoxidised as in Example 1. Deoxidising agents differing from those used in Example 1 and the powders obtained are set out in Table B2:

B2: Valve Metal Powders Obtained

| No. | Valve metal | T2 °C. | Inert gas | Deox. agent | Cap. kCV/g | Mg < ppm | Na < ppm | K ppm | f | N2 ppm |
|---|---|---|---|---|---|---|---|---|---|---|
| 1 | Ta | 950 | Ar | Ca | 122 | 1 | 1 | 1 | 0.86 | 170 |
| 2 | Ta | 980 | Ar | Ca | 163 | 1 | 1 | 1 | 0.88 | 159 |
| 3 | Ta | 1000 | Ar | Ca | 83 | 1 | 1 | 1 | 0.89 | 163 |
| 4 | Ta | 1020 | Ar | Ca | 78 | 1 | 1 | 1 | 0.89 | 181 |
| 5 | Ta | 930 | Ar | Ca | 156 | 1 | 1 | 1 | 0.82 | 175 |
| 6 | Ta | 950 | Ar | Ce | 177 | 1 | 1 | 1 | 0.84 | 165 |
| 7 | Ta | 980 | Ar | Ce | 165 | 1 | 1 | 1 | 0.88 | 178 |
| 8 | Ta | 1000 | Ar | La | 180 | 1 | 1 | 1 | 0.90 | 166 |
| 9 | Ta | 1020 | Ar | La | 203 | 1 | 1 | 1 | 0.89 | 197 |
| 10 | Ta | 930 | Ar | La | 309 | 1 | 1 | 1 | 0.80 | 194 |
| 11 | Ta | 950 | N2 | La | 280 | 1 | 1 | 1 | 0.83 | 2200 |
| 12 | Ta | 980 | N2 | La | 210 | 1 | 1 | 1 | 0.86 | 2900 |
| 13 | Ta | 950 | N2 | Ca | 278 | 1 | 1 | 1 | 0.88 | 2250 |
| 14 | Ta | 980 | N2 | Ca | 223 | 1 | 1 | 1 | 0.90 | 2940 |
| 15 | Ta | 1000 | N2 | Ca | 178 | 1 | 1 | 1 | 0.90 | 4200 |
| 16 | Nb | 930 | Ar | Ca | | 1 | 1 | 1 | 0.84 | 172 |
| 17 | Nb | 950 | Ar | Ca | | 1 | 1 | 1 | 0.85 | 193 |
| 18 | Nb | 980 | Ar | Ca | | 1 | 1 | 1 | 0.89 | 182 |
| 19 | Nb | 1000 | Ar | Ca | | 1 | 1 | 1 | 0.90 | 177 |
| 20 | Nb | 1020 | Ar | Ca | | 1 | 1 | 1 | 0.89 | 194 |
| 21 | Nb | 930 | Ar | La | | 1 | 1 | 1 | 0.80 | 186 |
| 22 | Nb | 950 | Ar | La | | 1 | 1 | 1 | 0.83 | 169 |
| 23 | Nb | 980 | Ar | La | | 1 | 1 | 1 | 0.84 | 170 |
| 24 | Nb | 1000 | Ar | La | | 1 | 1 | 1 | 0.85 | 174 |
| 25 | Nb | 1020 | Ar | La | | 1 | 1 | 1 | 0.87 | 171 |
| 26 | Nb | 930 | N2 | Ca | | 1 | 1 | 1 | 0.81 | 2900 |
| 27 | Nb | 950 | N2 | Ca | | 1 | 1 | 1 | 0.86 | 4200 |
| 28 | Nb | 980 | N2 | Ca | | 1 | 1 | 1 | 0.84 | 5100 |
| 29 | Nb | 1000 | N2 | Ca | | 1 | 1 | 1 | 0.90 | 6300 |
| 30 | Nb | 1020 | N2 | Ca | | 1 | 1 | 1 | 0.88 | 6600 |
| 31 | Nb | 980 | N2 | Ce | | 1 | 1 | 1 | 0.86 | 4900 |

The invention claimed is:

1. A process comprising: melting a mixture comprising a valve metal precursor and a diluting agent in at least one first vessel under a first set of temperature and residence time conditions; transferring the mixture to at least one second vessel; and initiating, in the at least one second vessel, a reaction of the valve metal precursor to form a valve metal under a second set of temperature and residence time conditions, wherein a reducing agent is added to the at least one second vessel.

2. The process according to claim 1, further comprising transferring the mixture from the at least one second vessel to at least one third vessel; and further mixing the mixture in the at least one third vessel under a third set of temperature and residence time conditions, wherein the reaction of the valve metal precursor to form the valve metal is continued.

3. The process according to claim 2, further comprising transferring the mixture from the at least one third vessel to at least one fourth vessel;
and further mixing the mixture in the at least one fourth vessel under a fourth set of temperature and residence time conditions, wherein the reaction of the valve metal precursor to form the valve metal is continued.

4. The process according to claim 1, wherein an additional mixture component selected from the group consisting of valve metal precursors, reducing agents, diluting agents and mixtures thereof is added to the at least one second vessel.

5. The process according to claim 2, wherein an additional mixture component selected from the group consisting of valve metal precursors, reducing agents, diluting agents and mixtures thereof is added to the at least one second vessel, the at least one third vessel or both.

6. The process according to claim 1, wherein a doping agent is added to the at least one first vessel, the at least one second vessel, or both.

7. The process according to claim 2, wherein a doping agent is added to the at least one first vessel, the at least one second vessel, the at least one third vessel, or a combination thereof.

8. The process according to claim 4, wherein the additional mixture component comprises a reducing agent selected from the group consisting of alkali metals.

9. The process according to claim 5, wherein the additional mixture component comprises a reducing agent selected from the group consisting of alkali metals.

10. The process according to claim 1, wherein the valve metal precursor comprises a component selected from the group consisting of potassium heptafluorotantalate, potassium heptafluoroniobate, and mixtures thereof.

11. The process according to claim 1, wherein the diluting agent comprises a component selected from the group consisting of alkali halides, supercritical fluids thereof, and mixtures thereof.

12. The process according to claim 6, wherein the doping agent comprises a component selected from the group consisting of alkali metal sulfides, alkali metal sulfones, alkali metal sulfates, and mixtures thereof.

* * * * *

UNITED STATES PATENT AND TRADEMARK OFFICE
CERTIFICATE OF CORRECTION

PATENT NO. : 8,623,112 B2  Page 1 of 1
APPLICATION NO. : 12/067063
DATED : January 7, 2014
INVENTOR(S) : Löffelholz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this
Twenty-second Day of September, 2015

Michelle K. Lee
*Director of the United States Patent and Trademark Office*